US006980989B2

(12) United States Patent
Silverman et al.

(10) Patent No.: US 6,980,989 B2
(45) Date of Patent: Dec. 27, 2005

(54) SYSTEM AND METHOD FOR TRANSACTION ACCESS CONTROL

(75) Inventors: Brian D. Silverman, Bellevue, WA (US); Mitchell O. Peterson, Mercer Island, WA (US)

(73) Assignee: Attachmate Corporation, Bellevue, WA (US)

( * ) Notice: Subject to any disclaimer, the term of this patent is extended or adjusted under 35 U.S.C. 154(b) by 306 days.

(21) Appl. No.: 10/416,276

(22) PCT Filed: Nov. 13, 2001

(86) PCT No.: PCT/US01/47786

§ 371 (c)(1),
(2), (4) Date: Aug. 8, 2003

(87) PCT Pub. No.: WO02/39239

PCT Pub. Date: May 16, 2002

(65) Prior Publication Data

US 2004/0015499 A1 Jan. 22, 2004

Related U.S. Application Data

(60) Provisional application No. 60/248,240, filed on Nov. 13, 2000.

(51) Int. Cl.$^7$ .............................................. G06F 17/30

(52) U.S. Cl. .................. 707/9; 707/104.1; 707/10; 709/203; 709/223; 713/202

(58) Field of Search .................... 707/1, 9, 10, 100, 707/104.1; 709/203, 217, 223–226; 713/200–202

(56) References Cited

U.S. PATENT DOCUMENTS

| 6,360,254 B1 * | 3/2002 | Linden et al. ............... 709/219 |
| 6,381,579 B1 | 4/2002 | Gervais et al. ............... 705/8 |
| 6,460,141 B1 | 10/2002 | Olden ........................ 713/201 |
| 6,484,263 B1 * | 11/2002 | Liu ............................ 713/201 |
| 2003/0177364 A1 * | 9/2003 | Walsh et al. |

FOREIGN PATENT DOCUMENTS

| EP | 0 918 412 A2 | 5/1999 | |
| EP | 0977399 A2 * | 2/2000 | ........... H04L 12/24 |
| WO | WO 00/51031 | 8/2000 | |

* cited by examiner

Primary Examiner—Greta Robinson
Assistant Examiner—Cheryl Lewis
(74) Attorney, Agent, or Firm—Seed IP Law Group PLLC

(57) ABSTRACT

A computer implemented system controls transaction access of requester applications running on end-user computers having network protocol addresses, to internal applications and their associated transactions running in internal transaction areas of host computer systems. Related to each network protocol address, a requester database contains information related to each network protocol address including end-user identification, possible username and password and instructions, possible priority levels of select transactions, and authorized transactions. A listener listens for a connect request from one of the end-user computers. A validator, using the requester database, determines whether the end-user computer has a valid network protocol address. An external communication module receives subsequent transaction requests from validated end-user computers and a validator in conjunction with a requester database determines among other things whether the transactions requested are authorized for particular end-user computers. Usernames and passwords are sent to an external security manager for authorized transactions.

67 Claims, 11 Drawing Sheets

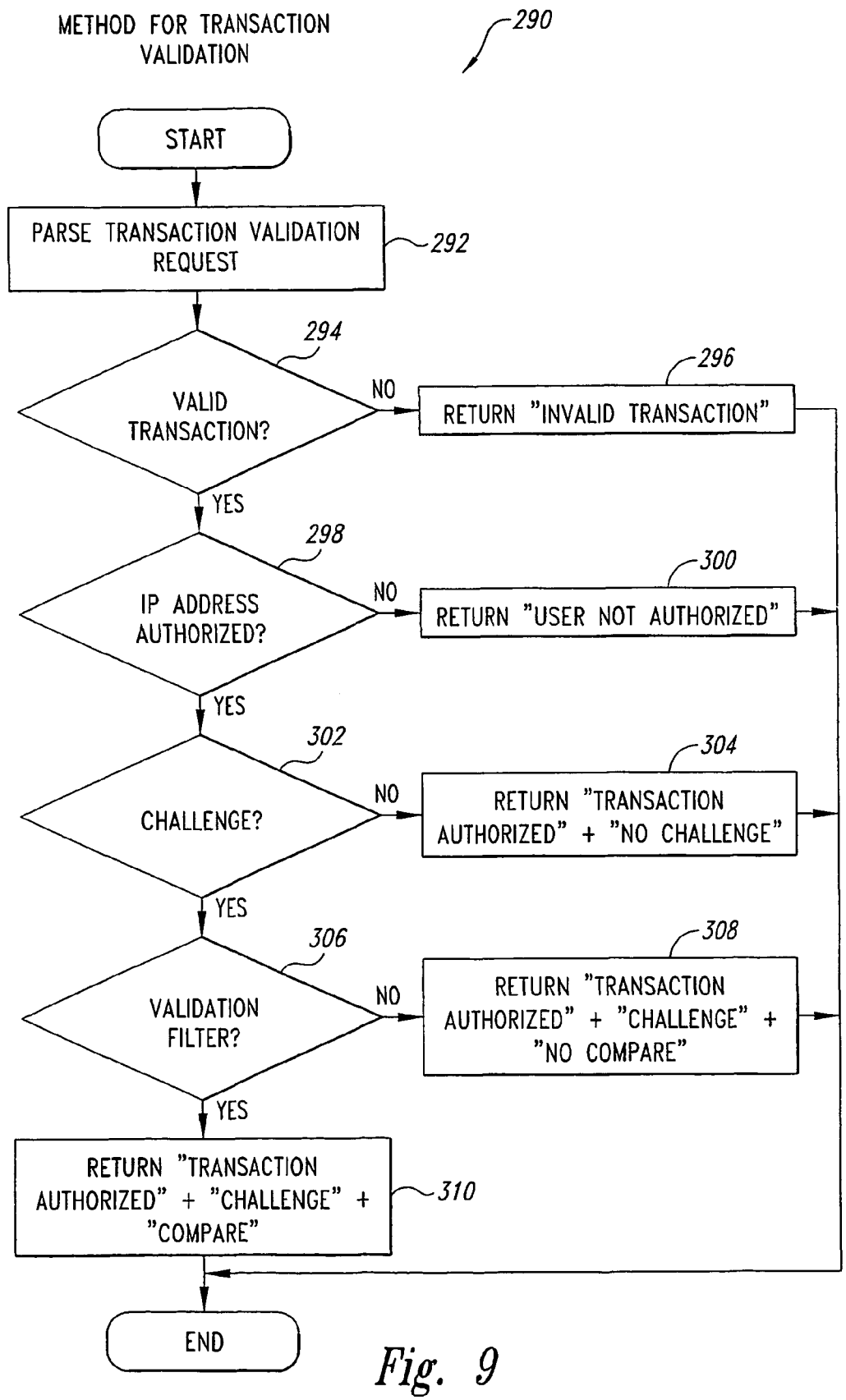

SYSTEM AND METHOD FOR TRANSACTION ACCESS CONTROL

CROSS-REFERENCES TO RELATED APPLICATIONS

This application is a National Stage Application of International Application No. PCT/US01/47786, filed Nov. 13, 2001, which claims the benefit under 35 U.S.C. §119(e) of U.S. Provisional Patent Application No. 60/248,240, filed Nov. 13, 2000, where this provisional application is incorporated by reference in its entirety.

BACKGROUND OF THE INVENTION

1. Field of the Invention

The invention relates generally to computer applications, systems and methods, and more particularly to computer systems and methods for controlling access to transactions associated with an internal transaction area of a host computer.

2. Description of the Related Art

Conventional host computer systems provide services for typically large numbers of end-users using end-user computers such as terminals, personal computers, workstations, and computer servers. The services are furnished through internal applications running in internal transaction areas of the host computer systems, which allow for series of transactions to occur between the host computer systems and the end-user computers. Each transaction is typically a bounded unit of work or finite task associated with an internal transaction area. Any particular internal transaction area has numerous associated transactions, so the examples given herein are merely representative and exemplary in nature and not to be construed to be all-inclusive. For instance, a transaction could return data, or could put data, or could add data.

Access to the internal applications and their associated transactions is typically authorized based upon the sensitivity of the internal applications and their associated transactions compared with the degree of physical security precautions implemented in the particular locale in which the end-user computers are located. For instance, regarding internal application sensitivity, if the internal applications and their related transactions are associated with such data as financial data, inventory data, trade secret data, or management planning data, the applications and transactions would most likely be viewed as having a relatively high level of sensitivity. On the other hand, if the internal applications and their associated transactions are related to information readily obtained by the general public such as retail prices of particular items, general news, or other types of general interest data, the internal applications and their associated transactions would most likely be viewed as having a lesser level of sensitivity.

Regarding physical security, a relatively high degree of physical security, for instance, could involve end-user computers being located in buildings having physically controlled access, such as through manned checkpoints, barriers operated by badge reading devices, and locked doors. A relatively high degree of physical security could also involve end-user computers having communication nodes that were directly tied into the host computer system and were difficult to remove from their locale. A relatively low degree of physical security, for instance, could involve the end-user computers being located in areas accessible to the general public or using communication nodes that were shared with the general public.

If an internal application and its associated transactions are deemed to have a relatively high degree of sensitivity, oftentimes, if at least one or a few number of end-user computers have a relatively low degree of associated physical security, then correct input of usernames (user-identification) and passwords is required of all of the associated end-users using any end-user computer, regardless of the physical security of the end-user computer involved, in order to be given proper authorization to access the internal application and associated transactions. Other times, a particular internal application and its associated transactions could be deemed as having a relatively high enough degree of sensitivity that input of usernames and passwords would be required not only to access the particular internal application and its associated transactions, but also to access other internal applications running on the host computer system regardless of the physical security of any associated end-user computer.

It is unfortunate in these conventional approaches that if usernames and passwords are required by a host computer system of end-users of particular end-user computers to access an internal application of the host computer system, the requirement is generally imposed upon all end-users of any end-user computers, regardless of the physical security of the end-user computers. The inflexibility of these conventional approaches, at times, introduces unnecessary inconvenience to some, if not many of the end-users of a particular internal application. The end-user computer with the relatively lowest level of physical security is a decisive reason regarding the requirement for entry of usernames and passwords for an entire group of end-user computers accessing the particular internal application and its associated transactions.

To compound the inconvenience, oftentimes a particular internal application and its associated transactions with the relatively highest level of sensitivity is also another decisive reason for the requirement for entry of usernames and passwords. Consequently, even though some or most of a group of internal applications and their associated transactions running on a host computer system have a relatively low level of sensitivity that requires no entry of usernames and passwords regardless of the physical security of the end-user computer, entry of usernames and passwords is still required because of a relatively highly sensitive internal application and its associated transactions running on the host computer system.

Herein are described computer based systems and methods directed toward these and other issues. Other features and advantages will become apparent from the following detailed description, taken in conjunction with the accompanying drawings.

SUMMARY OF THE INVENTION

A transaction access control system is for use with an internal transaction area and an internal application running in the internal transaction area on a host computer connected to a network, for use with an external security manager configured to receive and authenticate a first plurality of pairs of usernames and passwords to permit or deny access to the internal transaction area, and for use with a first plurality of end-user computers communicatively linked to the host computer via the network, the end-user computers each having at least one of a first plurality of network protocol addresses and a requester application. Aspects include a requester database configured to contain for each of the first plurality of network protocol addresses of the first plurality of end-user computers, an associated one of the first plurality of pairs of usernames and passwords. A controller is configured to receive the first plurality of network protocol addresses sent from the first plurality of the end-user computers via the network and received by the host computer.

Further aspects include a validator configured to retrieve from the requester database each of the first plurality of username and password pairs associated with each of the first plurality of network protocol addresses based upon at least each of the first plurality of network protocol addresses. The controller is further configured to transmit each of the retrieved username and password pairs to be authenticated by the external security manager to permit access to the internal transaction area to each of the requester applications of the end-user computers having the first plurality of network protocol addresses which are associated with the retrieved username and password pairs.

Other features and advantages of the invention will become apparent from the following detailed description, taken in conjunction with the accompanying drawings.

BRIEF DESCRIPTION OF THE DRAWINGS

FIG. 9 is a flowchart illustrating a more particular method implemented by the validator associated with the transaction access control system, as illustrated in FIG. 2, for transaction validation.

DETAILED DESCRIPTION OF THE INVENTION

Figure 1:
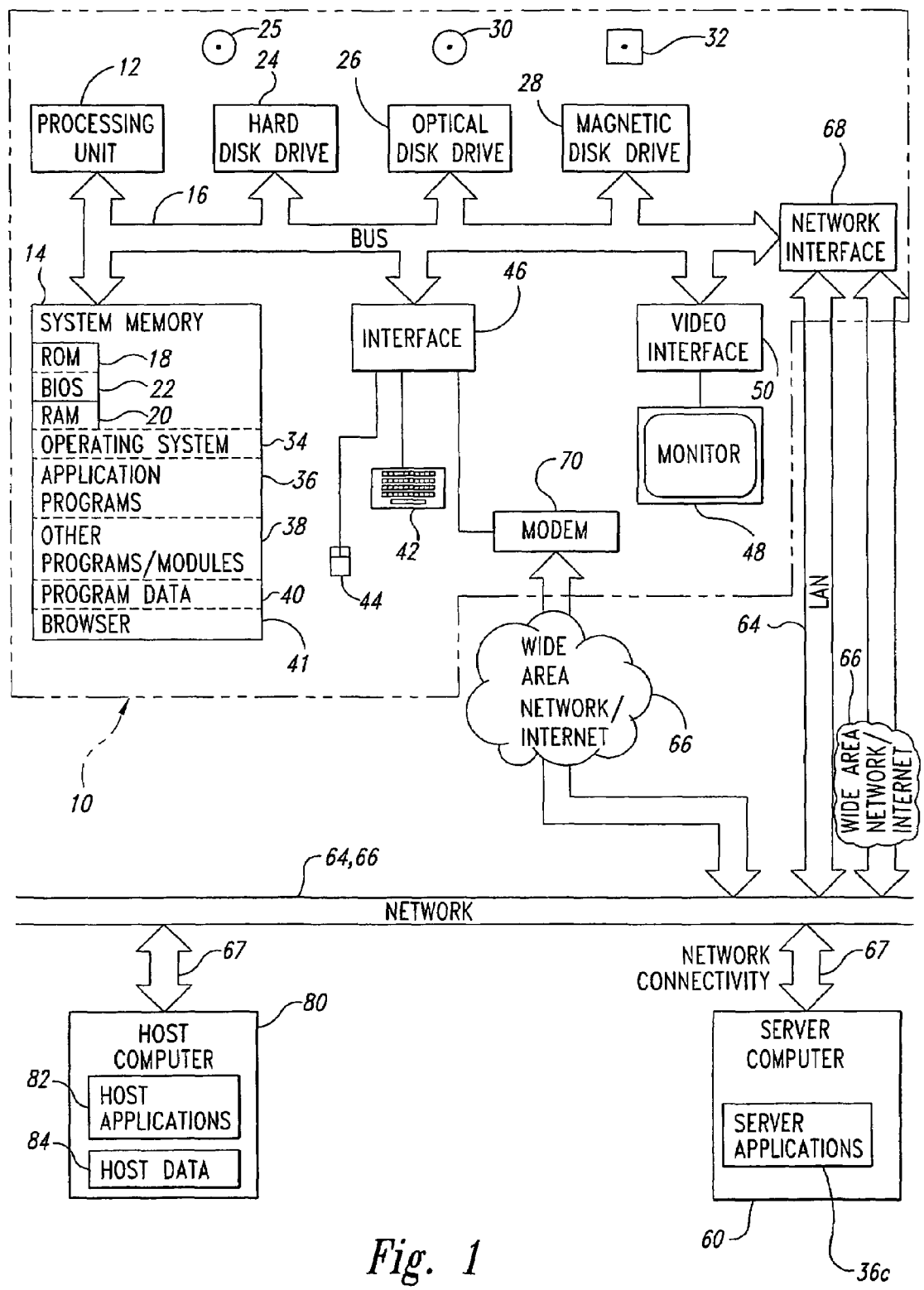
FIG. 1 is a schematic diagram of a computing system suitable for employing implementations described herein.

Described herein are systems and methods for transaction access control of requester applications running on end-user terminal-emulator computers, client computers, and/or server computers to control access to internal applications and their associated transactions running in internal transaction areas of host computer systems. The transaction access control systems are configured to operate cooperatively with external security managers that are conventionally provided to operate with the internal transaction areas and that are configured to receive and authenticate a plurality of pairs of usernames and passwords to permit or deny access to the internal transaction areas based upon username-password authentication. The transaction access control systems and methods use network protocol addresses, such as IP and IPX, of the end-user requester computers running the requester applications to identify particular end-user computers requesting access to particular internal applications and their associated transactions. A requester database contains fields including those identifying network protocol addresses (such as either individual addresses or ranges of addresses) of the end-user computers, and at least some of the following associated with each network protocol address: identification of the associated end-user, the username or other identifier of the end-user and password to be used if any, instructions regarding use of the username and password (such as whether the end-user should be challenged to submit their username and password and if a challenge is required, whether the submitted username and password should be verified with respect to the requester database before being sent to the external security manager), transaction execution priorities (for instance, containing designators possibly indicating priorities based upon transaction type, end-user involved, or a combination), and authorized transactions available.

The requester database allows an administrator to associate end-users with particular network protocol addresses. The administrator can customize how the transaction access control system will respond to transaction access requests by various end-users using end-user computers based upon the network protocol address of the particular end-user computer that is being used. For instance, the administrator can configure the transaction access control system so that for given network protocol addresses requesting certain transactions involving particular internal applications, usernames and passwords stored in the requester database are supplied to the external security manager of the host computer system to allow the end-user computers associated with the given network protocol addresses, access to the certain transactions involving particular internal applications.

Other end-user computers associated with other network protocol addresses can be denied access or challenges can be issued by the transaction access control system. For instance, a challenge can be issued requesting the username and password of the end-user using the particular end-user computer. The username and password furnished by the end-user can be optionally compared by the transaction access control system with the associated username and password stored in the requester database. The furnished username and password is sent to the external security manager of the host computer system if the optional comparison is not made or the optional comparison is made with a successful match occurring. The administrator has flexibility in assigning various priorities to different network protocol addresses so that transaction access requests by end-user computers are given different treatment regarding execution scheduling depending on the priorities assigned. The administrator can also identify which transactions are authorized for a particular network protocol address so that unauthorized transaction requests are denied before reaching the internal area access of the host computer system and its associated external security manager.

In these and other ways, the transaction access control system acts as a front end to the internal transaction area of the host computer system and its external security manager to offload initial security filtering of transaction requests such that in general only authorized transaction requests by validated end-user computers reach the internal transaction area of the host computer system and its associated external security manager. Also, potential exists for greater convenience to the end-users relative to conventional approaches since requirements for username and password entry can be identified to particular network protocol addresses and their associated end-user computers.

Further consequences of the transaction access control system can include generally eliminating the necessity for end-users to know mainframe usernames and passwords. Initial screening and front end security can be increased without over-burdening existing host security systems. Remote configuration of requester databases associated with the transaction control system need not require systems programming knowledge. Network protocol address ranges (such as IP or IPX address ranges) can be tailored to correspond to enterprise organizations, geographies, or job categories. Competing transaction requests can be prioritized through use of the requester database and network protocol addresses based upon attributes such as related to organization, geography, transaction type, or transaction runtime characteristics (such as being batch oriented, burst oriented, real-time interactive, associated with application systems type, or having externally imposed priorities). Redirection of transaction requests based upon their network protocol addresses to other host computer systems can be transparent to the end-user. Categories of transaction requests can be channeled to specific regions of the internal transaction area of the host computer system, to increase efficiencies, based upon the network protocol addresses of the transaction requests. Usernames and passwords can be provided by the transaction access control system based upon the network protocol addresses to facilitate access to internal transaction areas where no traditional logon was possible due to limitations of particular host internal area access systems (such as bridges) involved. Potential for challenged responses from the host internal area access system is possible to allow for real-time collection of usernames and passwords from the end-users.

In the following description, numerous specific details are provided to understand implementations. One skilled in the relevant art, however, will recognize that the invention can be practiced without one or more of these specific details, or with other equivalent elements and components, etc. In other instances, well-known components and elements are not shown, or not described in detail, to avoid obscuring aspects of the invention or for brevity. In other instances, the invention may still be practiced if steps of the various methods described could be combined, added to, removed, or rearranged.

FIG. 1 and the following discussion provide a brief, general description of a suitable computing environment. Although not required, implementations of the present invention will be described in the general context of computer-executable instructions, such as program application modules, objects, or macros being executed by a personal computer. Those skilled in the relevant art will appreciate that the invention can be practiced with other computer system configurations, including hand-held devices, multi-processor systems, microprocessor-based or programmable consumer electronics, network PCs, mini computers, mainframe computers, and the like. Implementations can be practiced in distributed computing environments where tasks or modules are performed by remote processing devices, which are linked through a communications network including wired and wireless environments. In a distributed computing environment, program modules may be located in both local and remote memory storage devices.

Referring to FIG. 1, a conventional personal computer, referred to herein as a client computer 10, includes a processing unit 12, a system memory 14 and a system bus 16 that couples various system components including the system memory to the processing unit. The client computer 10 will at times be referred to in the singular herein, but this is not intended to limit implementations to a single client computer since in typical implementations, there will be more than one client computer or other device involved. The processing unit 12 may be any logic processing unit, such as one or more central processing units (CPUs), digital signal processors (DSPs), application-specific integrated circuits (ASICs), etc. Unless described otherwise, the construction and operation of the various blocks shown in FIG. 1 are of conventional design. As a result, such blocks need not be described in further detail herein, as they will be understood by those skilled in the relevant art.

The system bus 16 can employ any known bus structures or architectures, including a memory bus with memory controller, a peripheral bus, and a local bus. The system memory 14 includes read-only memory ("ROM") 18 and random access memory ("RAM") 20. A basic input/output system ("BIOS") 22, which can form part of the ROM 18, contains basic routines that help transfer information between elements within the client computer 10, such as during start-up.

The client computer 10 also includes a hard disk drive 24 for reading from and writing to a hard disk 25, and an optical disk drive 26 and a magnetic disk drive 28 for reading from and writing to removable optical disks 30 and magnetic disks 32, respectively. The optical disk 30 can be a CD-ROM, while the magnetic disk 32 can be a magnetic floppy disk or diskette. The hard disk drive 24, optical disk drive 26 and magnetic disk drive 28 communicate with the processing unit 12 via the bus 16. The hard disk drive 24, optical disk drive 26 and magnetic disk drive 28 may include interfaces or controllers (not shown) coupled between such drives and the bus 16, as is known by those skilled in the relevant art. The drives 24, 26 and 28, and their associated computer-readable media, provide nonvolatile storage of computer readable instructions, data structures, program modules and other data for the client computer 10. Although the depicted client computer 10 employs hard disk 25, optical disk 30 and magnetic disk 32, those skilled in the relevant art will appreciate that other types of computer-readable media that can store data accessible by a computer may be employed, such as magnetic cassettes, flash memory cards, digital video disks ("DVD"), Bernoulli cartridges, RAMs, ROMs, smart cards, etc.

Program modules can be stored in the system memory 14, such as an operating system 34, one or more application programs 36, other programs or modules 38 and program data 40. The system memory 14 also includes a browser 41 for permitting the client computer 10 to access and exchange data with sources such as web sites of the Internet, corporate intranets, or other networks as described below, as well as other server applications on server computers such as those further discussed below. The browser 41 in the depicted implementation is markup language based, such as Hypertext Markup Language (HTML), Extensible Markup Language (XML) or Wireless Markup Language (WML), and operates with markup languages that use syntactically delimited characters added to the data of a document to represent the structure of the document. Although the depicted implementation shows the client computer 10 as a personal computer, in other implementations, the client computer is some other computer related device such as a personal data assistant (PDA) or a cell phone or other mobile device.

While shown in FIG. 1 as being stored in the system memory 14, the operating system 34, application programs 36, other programs/modules 38, program data 40 and browser 41 can be stored on the hard disk 25 of the hard disk drive 24, the optical disk 30 of the optical disk drive 26 and/or the magnetic disk 32 of the magnetic disk drive 28. Included with the application programs 36 and with the other programs/modules 38, or terminal emulation programs. A user can enter commands and information into the client computer 10 through input devices such as a keyboard 42 and a pointing device such as a mouse 44. Other input devices can include a microphone, joystick, game pad, scanner, etc. (not shown). These and other input devices are connected to the processing unit 12 through an interface 46 such as a serial port interface that couples to the bus 16, although other interfaces such as a parallel port, a game port or a wireless interface or a universal serial bus ("USB") can be used. A monitor 48 or other display device is coupled to the bus 16 via a video interface 50, such as a video adapter. The client computer 10 can include other output devices, such as speakers, printers, etc.

The client computer 10 can operate in a networked environment using logical connections to one or more remote computers, such as a server computer 60. The server computer 60 can be another personal computer, a server, another type of computer, or a collection of more than one computer communicatively linked together and typically includes many or all of the elements described above for the client computer 10. The server computer 60 is logically connected to one or more of the client computers 10 under any known method of permitting computers to communicate, such as through a local area network ("LAN") 64, or a wide area network ("WAN") or the Internet 66 wherein the server computer 60 is communicatively linked by a conventional network connectivity 67. Such networking environments are well known in wired and wireless enterprise-wide computer networks, intranets, extranets, and the Internet. Other implementations include other types of communication networks including telecommunications networks, cellular networks, paging networks, and other mobile networks.

When used in a LAN networking environment, the client computer 10 is connected to the LAN 64 through an adapter or network interface 68 (communicatively linked to the bus 16). When used in a WAN networking environment, the client computer 10 often includes a modem 70 or other device, such as the network interface 68, for establishing communications over the WAN/Internet 66. The modem 70 is shown in FIG. 1 as communicatively linked between the interface 46 and the WAN/Internet 66. In a networked environment, program modules, application programs, or data, or portions thereof, can be stored in the server computer 60. In the depicted implementation, the client computer 10 is communicatively linked to the server computer 60 through the LAN 64 or the WAN/Internet 66 with TCP/IP middle layer network protocols; however, other similar network protocol layers are used in other implementations. Those skilled in the relevant art will readily recognize that the network connections shown in FIG. 1 are only some examples of establishing communication links between computers, and other links may be used, including wireless links.

In some implementations, the server computer 60 is further communicatively linked to a legacy host data system 80 typically through the LAN 64 or the WAN/Internet 66 or other networking configuration such as a direct asynchronous connection (not shown) wherein the legacy host data system 80 is communicatively linked by the network connectivity 67. With other implementations, the client computer 10 is further communicatively linked (not shown) to the legacy host data system 80 typically through the LAN 64 or the WAN/Internet 66 or other networking configurations such as a direct asynchronous connection. Other implementations may support the server computer 60 and the legacy host data system 80 by one computer system by operating all server applications and legacy host data system on the one computer system. The legacy host data system 80 in an exemplary implementation is an International Business Machines (IBM) 390 mainframe computer configured to support IBM 3270 type terminals. Other exemplary implementations use other vintage host computers such as IBM AS/400 series computers, UNISYS Corporation host computers, Digital Equipment Corporation VAX host computers and Asynchronous host computers as the legacy host data system 80. The legacy host data system 80 is configured to run host applications 82 such as in system memory and store host data 84 such as business related data.

An exemplary implementation uses Sun Microsystems Java programming language to take advantage of, among other things, the cross-platform capabilities found with the Java language. For instance, exemplary implementations include the server computer 60 running Windows NT, Win2000, Solaris, Apple MacIntosh OS (e.g. 9.x or X) or Linux operating systems. In exemplary implementations, the server computer 60 runs Apache Tomcat/Tomcat Jakarta web server, Microsoft Internet Information Server (ISS) web server, or BEA Weblogic web server.

Apache is a freely available Web server that is distributed under an "open source" license and runs on most UNIX-based operating systems (such as Linux, Solaris, Digital UNIX, and AIX), on other UNIX/POSIX-derived systems (such as Rhapsody, BeOs, and BS2000/OSD), on ArnigaOS, and on Windows 2000/NT/95/98/ME. Windows-based systems with Web servers from companies such as Microsoft and Netscape are alternatives, but Apache web server seems suited for enterprises and server locations (such as universities) where UNIX-based systems are prevalent. Other implementations use other web servers and programming languages such as C, C++, and C#.

Figure 2:
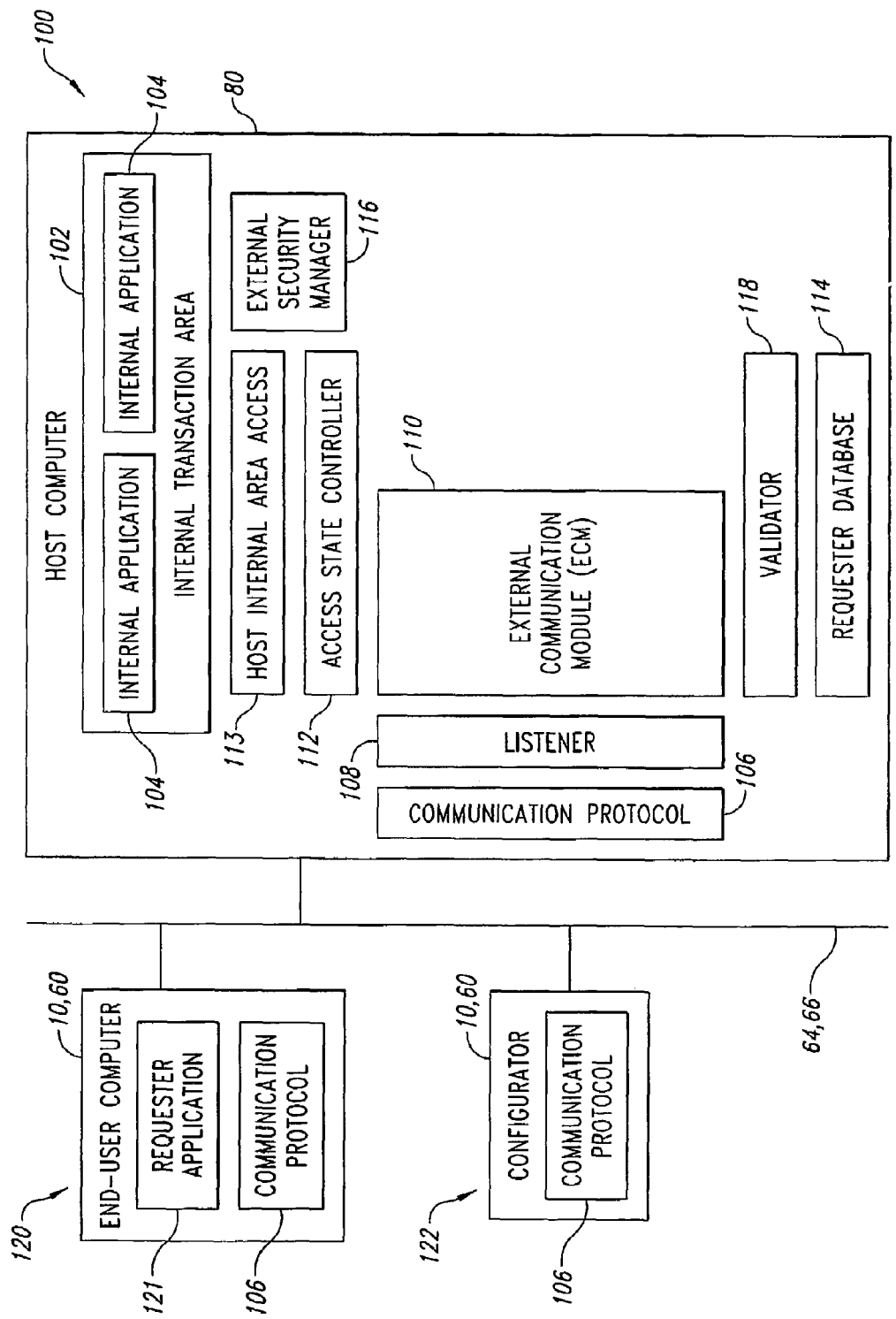
FIG. 2 is a schematic diagram illustrating an implementation of a transaction access control system to control access to transactions of internal applications running in an internal transaction area on a host computer by a requestor application running on an end-user computer.

A transaction access control system 100 is illustrated in FIG. 2 as running on the legacy host data system 80. Included on the legacy host data system 80 of the transaction control system 100 is an internal transaction area 102 with internal applications 104. Also included is a communication protocol 106, a listener 108, and external communication module (ECM) 110, an access state controller 112, a requester database 114, an external security manager 116, and a validator 118. For some implementations, when needed, a host internal area access 113 is also included to provide access to the internal transaction area 102. The transaction control system 100 is connected by a network such as the LAN 64 or WAN/Internet 66 to an end-user computer 120 being one of the client computers 10 as a personal computer/workstation or as a terminal emulation program platform, or being one of the server computers 60.

The end-user computer 120 runs a requester application 121 and is connected to the LAN 64 or the WAN/Internet 66 to use the communication protocol 106 to communicate with the legacy host data system 80 including the transaction control system 100. In some implementations, the requester application 121 typically includes an application program interface (API) written in the perspective of a high-level language such as High Level Language Application Programming Interface (HLLAPI), Server Enterprise Access Class Library (SEACL) (Attachmate Corp., Bellevue, Washington), etc. to indicate, for instance, row and column of a virtual computer terminal from or into which data is to be extracted or placed. In other implementations, one or more of the client computers 10 and/or the server computers 60 can be running a terminal emulation to communicate with the legacy host data system 80 via the communication protocol 106. The transaction access control system 100 is connected by a network such as the LAN 64 or WAN/Internet 66 to a configurator 122 being one of the client computers 10 as a personal computer/workstation or as a terminal emulation program platform, or being one of the server computers 60. The configurator 122 allows an administrator to configure the requester database 114 remotely through graphical user interfaces without sophisticated systems level expertise required. In other implementations, the configurator 122 is located on the legacy host data system 80. In implementations, some components of the transaction access control system 100, such as the validator 118 and the requester database 114, can be located on computers other than the legacy host data system 100 receiving a particular transaction request from the end-user computer 120. Relocation of some components of the transaction access control system 100 may provide advantages such as related to performance efficiencies or resource allocation issues.

In some implementations, the access state controller 112 controls invocation of the host internal area access 113 across multiple internal applications 104 and maintains in-transaction and out-of-transaction states necessary to satisfy the host internal area access, the internal transaction area 102, and other areas of the legacy host data system 80 of the transaction access control system 100. In these implementations, the access state controller 112 maintains the state of the host internal area access 113, and interface components of the requester applications 121 while only requiring the requester applications to maintain transactions through conventional screen-scraping interfaces and other mechanisms familiar with developers of external applications. Furthermore, the access state controller 112 analyzes addresses of received communication from the requester applications 121 with respect to state information of associated internal applications 104 running in the designated internal transaction area 102. Based upon this analysis, the access state controller 112 either sends communication from the requester applications 121 in a format compliant with the internal transaction area 102 to one of the internal applications 104 in the internal transaction area via a host internal area access 113 or first send communication to a virtual host terminal (not shown) also running on the same legacy host data system 80 of the internal transaction area. The virtual host terminal reflects what a computer terminal handling communication compliant with the internal transaction area would display when operating on a network and is described in a co-pending application.

In implementations of the transaction access control system 100, the host internal area access 113 can be systems including host bridges, bridge exits, and program exits to allow communication with one or more of the internal applications 104 running in the internal transaction area 102 of the legacy host computer system 80. These implementations of the host internal area access 113 allow for one or more cycle points of the internal applications 104, which give control of the internal applications to applications external to the internal transaction area 102 including host and client applications and modules that run outside of the internal transaction area. This control of the internal applications 104 allows end-users of the external applications, such as the requester applications 121, to access internal application data, which would otherwise typically be accessed through antiquated legacy application systems. In order to access the internal applications 104 through the host internal area access 113, in some implementations, as described, languages oriented toward the internal transaction area 102 of the legacy host computer system 80 are used. In other implementations, the host internal area access 113 is configured such that the access state controller 112 is not required to the extent described, but is still used in conjunction with the validator 118 in the requester database 114 as described below.

Furthermore, host internal area access systems conventionally used without benefit of the transaction access control system 100 typically do not readily facilitate secured transactions such as when usernames and passwords are used. Consequently, those conventionally involved with applications external to the internal transaction area 102 must develop workarounds conventionally used to address requirements associated with secured transactions such as providing usernames and passwords. Unfortunately, these conventional workarounds tend only to be partially satisfactory. For instance, conventionally used applications external to the internal transaction area 102 have limited ability to communicate with the host internal area access 113 regarding aspects related to secure transactions, which results in the applications external to the internal transaction area having no feedback as to whether the usernames and passwords, which are sent, are correct. In cases when usernames and passwords are incorrectly provided by the external applications, the secured transactions with the host internal area access systems fail without indication of the failure provided to the external applications.

The host internal area access 113 generally does not provide prompts or sign-on screens when the internal transaction area 102 and the internal applications 104 require usernames and passwords for access by the external applications, such as when the internal transaction area involves International Business Systems (IBM) Customer Information Control System (CICS) with a sign-on transaction based security system. It is possible for conventional approaches to use external applications that themselves prompt and save usernames and passwords to insert into every transaction into the access state controller 102, however, these approaches only partially address the problems involved. If usernames and passwords are managed by the applications external to the internal transaction area to be provided with every transaction into the host internal area access 110, problems arise when a username or password is improperly entered by an end-user.

Given the configuration of the typical host internal area access 113 and how the applications external to the internal transaction area may implement management of usernames and passwords, if an improper username or password is entered by an end-user and forwarded to the host internal area access 113, the transaction would simply fail without a status message regarding the username or password ever being sent back to the external application. End-users of applications external to the internal transaction area would experience failure in communication with the internal transaction area 102 and the internal applications 104 without appreciating the source of their problems. They may naturally be led to believe that the source of the communication failures was somehow located in the internal transaction area 102 without realizing that the source of the communications problems was due to their improper entry by the end-users of usernames and/or passwords. The transaction access control system 100 addresses these and other issues as described herein by assigning entry of the usernames and passwords into the requester database 114 to an administrator who most likely would be also assigned to enter the usernames and passwords in corresponding fashion into the database of the external security manager 116.

The external communication module 114, running on the legacy host data system 80 outside of the internal transaction area 102, is designed to receive from the requester applications 121, standardized high-level language based communication rather than computer terminal communication expected by the internal applications 104. The high-level languages include, but are not limited to, High-Level Language Application Programming Interface (HLLAPI), Server Enterprise Class Library (SEACL), Host Publishing Interfaces such as QACOM (a set of HLLAPI style interfaces by Attachmate Corp., Bellevue, Wash.), the OHIO specification (created jointly between IBM Corp. and Attachmate Corp., Bellevue, Wash.), and various playback/record interfaces conventionally known as navigation, macros, and/or scripting.

The external communication module 110 is also designed to receive from the requester applications 121, direct binary communication compliant with the particular internal transaction area 102, such as IBM CICS or one related to IBM AS/400 or UNISYS operating systems, on the legacy host data system 80 running the internal applications 104. The external communication module 110 is configured to route received communication from the requester applications 121 to the proper access state controller 112 or other appropriate processes. The external communication module 110 is also configured to convert external communication received from the requester applications 121 that is not in binary form compliant with the internal transaction area 102, such as markup languages including XML and HTML and other forms using protocols such as including HTTP. If needed, the external communication module 110 converts received communication into binary formatted data compliant with the internal transaction area 102.

The exemplary implementation of FIG. 2 also has the listener 108, which listens for initial connect messages from the requester applications 121 and helps establish transaction links between the requester applications and the external communication module 110. In some implementations, the operational combination of the access state controller 112 and the external communication module 110 results in communication, through the host internal area access 113, between requester applications 121 and the internal applications 104 running in the internal transaction area 102. Communication is provided without end-users of the requester applications 121 requiring expertise directed toward the host internal area access 113 and the internal transaction area 102, such as with programming languages, architectures, data structures, assembly languages, and other aspects. Examples of such expertise involves IBM CICS, IBM 3270 Bridge Exit, IBM CICS Front End Programming Interface (FEPI), or whatever mainframe integration technology developers of the external applications used to drive their legacy mainframe internal applications. This expertise typically includes knowledge of older programming and assembly languages and data structures involved with such languages as COBOL, PL/1, 370 Assembler and other languages. The expertise also generally includes, but is not limited to, the internal architecture, pseudo-conversational transactions, and conversational transactions of the internal transaction area, associated quasi-reentrant programming models, asynchronously started transactions, and continuity of multiple instantiations of multiple internal applications to achieve some overall goal. In other implementations, the requester applications 121 are configured using expertise directed toward the host internal area access 113 such that less conversion and/or less state tracking is necessary by the combination of the external communication module 110 and the access state controller 112. In some of these other implementations, the internal transaction area 102 and the host internal area access 113 have less demanding requirements for expertise thus allowing a configuration of the requester applications 121 more native to the internal transaction area.

Figure 3:
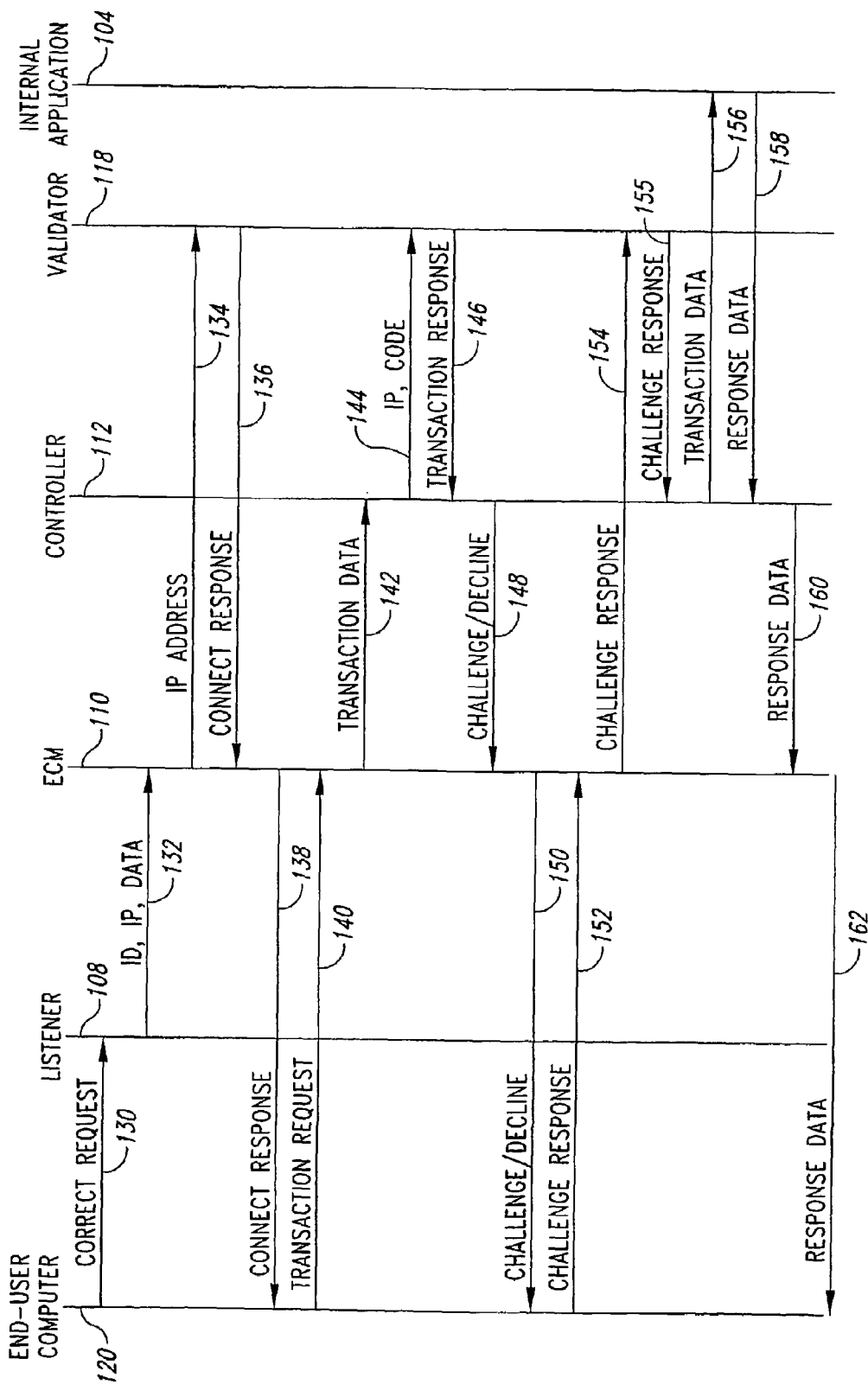
FIG. 3 is a communication diagram showing interactions between the requestor application, a listener, an external communication module, an access state controller, a validator, and an internal application associated with the transaction access control system, as illustrated in FIG. 2.

A communication diagram showing an exemplary interaction between components of a representative implementation of the transaction access control system 100, other components of the legacy host data system 80, and one of the end-user computers 120 is illustrated in FIG. 3. As depicted in this communication diagram, the end-user computer 120 first sends a connect request 130 to the legacy host data system 80. The listener 108 receives the connect request 130 and passes socket identification, network protocol address information of the end-user computer 120 (such as the IP or IPX address), and other user request data 132 to the external communication module 110. The external communication module 110 then sends the network protocol address information 134 (such as an IP or IPX address) of the end-user computer 120 to the validator 118.

The validator 118 performs validation functions including verifying that the network protocol address information corresponds to a valid network protocol address in accordance with the requester database 114. Upon performing validation functions, the validator 118 then sends to the external communication module 110 a connect response 136 indicating whether the network protocol address 134 corresponds to a valid network protocol address. Based upon the connect response 136 received from the validator 118, the external communication module 110 will then send a connect response 138 to the end-user computer 120 indicating the outcome of the connect request 130 as either a successful or failed connection. If the connect request 130 is successful, the end-user computer 120 will then send a transaction request 140 to the external communication module 110. The external communication module 110 will then send appropriate transaction request data 142 to the access state controller 112.

Upon receipt of the transaction request data 142, the access state controller 112 then sends information including the end-user computer network protocol address 134 and designating code of the requested transaction in the form of a message 144 to the validator 118. In response to the receipt of the message 144, the validator 118 performs transaction validation functions based upon the end-user computer network protocol address 132 and the designating code of the requested transaction in accordance with the requester database 114. Implementations of the transaction access control system 100 can include the following transaction validation functions: verification that the requested transaction is authorized for the network protocol address 132 associated with requesting end-user computer 120, determination whether the requesting end-user computer should be issued a challenge to enter username and password, determination whether the username and password submitted by the challenged end-user computer should be compared with the username and password associated with the network protocol address of the challenged end-user computer found in the requester database 114, and determination whether the code associated with the requested transaction is valid.

After performing transaction validation functions, the validator 118 then sends a transaction response 146 to the access state controller 112 containing instructions either challenging the end-user computer 120, declining the transaction request 140, or accepting the transaction request. If the transaction response 146 contains instructions regarding a challenge or a decline, the access state controller 112 will then send a message 148 containing either a challenge or a decline to the external communication module 110. The message 148 would contain a challenge if the validator 118 has determined that the end-user computer 120 should be challenged to provide a username and password. On the other hand, the message 148 would contain a decline if the validator 118 has determined that the end-user computer 120 should be notified that the requested transaction for the network protocol address 132 is invalid. Upon receipt of the message 148, the external communication module 110 sends a message 150 to the end-user computer 120 indicating either a corresponding challenge or decline. If the message 150 is a challenge, the end-user computer 120 will send a challenge response 152 to the external communication module 110 containing a submitted username and password. The external communication module 110 will then send a challenge response 154 with the submitted username and password to the validator 118. The submitted username and password will then be checked by the validator 118 with respect to the requester database 114 and the validator will then send a challenge response 155 to the access state controller 112 indicating whether the submitted username and password was valid or not.

As a consequence of receiving a valid challenge response 155 or of receiving instructions in the transaction response 146 to accept the transaction request 140, the access state controller 112 will send transaction data 156 to a designated one of the internal applications 104 via the host internal area access 113 if the validator has determined that the transaction request is valid for the network protocol address 132 associated with the end-user computer 120 and that no challenge is necessary. The transaction data 156 can include the user name and password, in accordance with the requester database 114, associated with the network protocol address 132 if needed by the external security manager 116, which could be running as Resource Access Control Facility (RACF), ACF, TopSecret, or other security packages. If the username and password of the end-user of the end-user computer 120 is needed in the transaction data 156, the external security manager 116 first verifies the username and password before the transaction data is sent to the internal transaction area 102 to be subsequently received by the designated internal application 104. Although the implementation of the transaction access control system 100 includes the validator 118 having validation functions described above, in other implementations of the transaction access control system, the validation functions are performed by versions of the external communication module 110 and the access state controller 112 thereby eliminating the necessity for a separate component or module for the validator.

Upon receipt of the transaction data 156, the internal application 104 performs the requested transaction and sends resultant response data 158 to the access state controller 112. Upon receipt of the response data 158, the access state controller 112 sends a response data 160 to the external communication module 110. Upon receipt of the response data 160, the external communication module 110 sends a response data 162 to the end-user computer 120.

Figure 4:
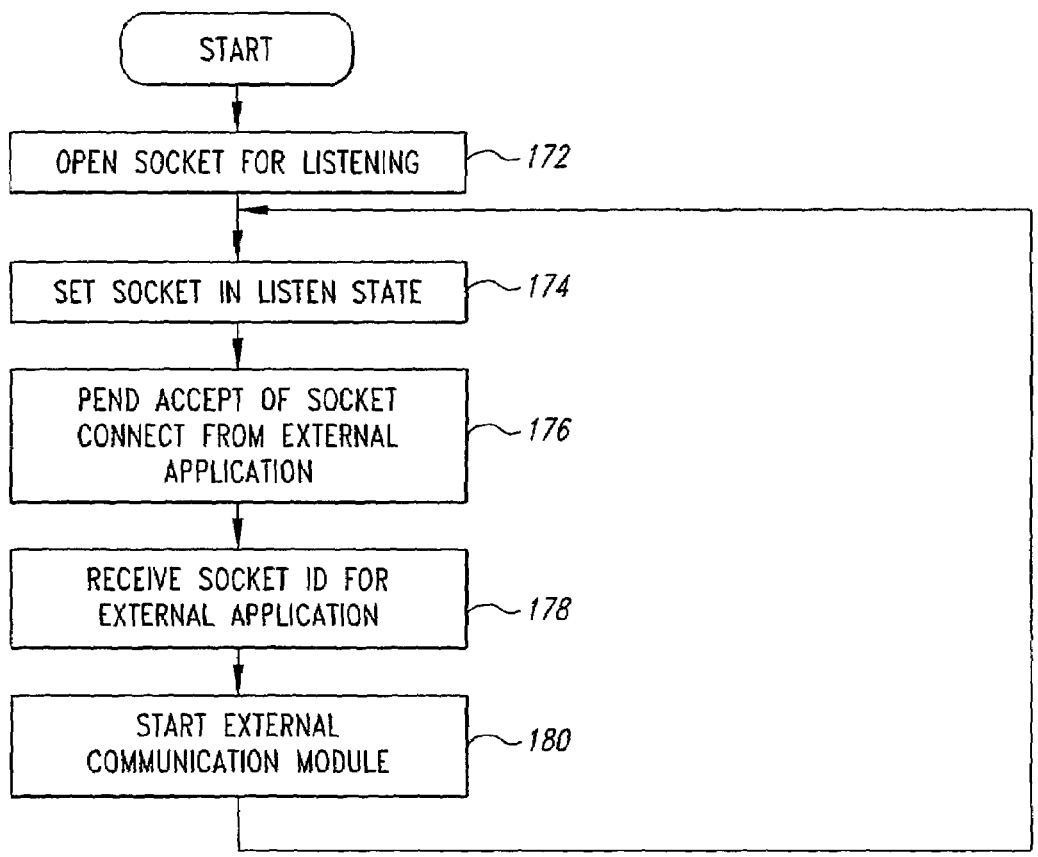
FIG. 4 is a flowchart illustrating a method implemented by the listener associated with the transaction access control system, as illustrated in FIG. 2, to receive initial connection from end-user computers.

An illustration of a method 170 of a representative implementation for the listener 108 to receive initial external communication requests is shown in FIG. 4. The method 170 opens a socket for the listener 108 to listen for initial connect requests sent from one of the end-user computers 120 (step 172) and sets the socket in a listen state (step 174). When an initial connect request is heard by the listener 108, the method 170 then pends an accept of a socket connect from the associated requester application 121 (step 176). Socket identification for the requester application 121 is then received (step 178). The external communication module 110 is then started to communicate with the requester application 121 (step 180) and the method 170 then goes back to step 174.

Figure 5A:
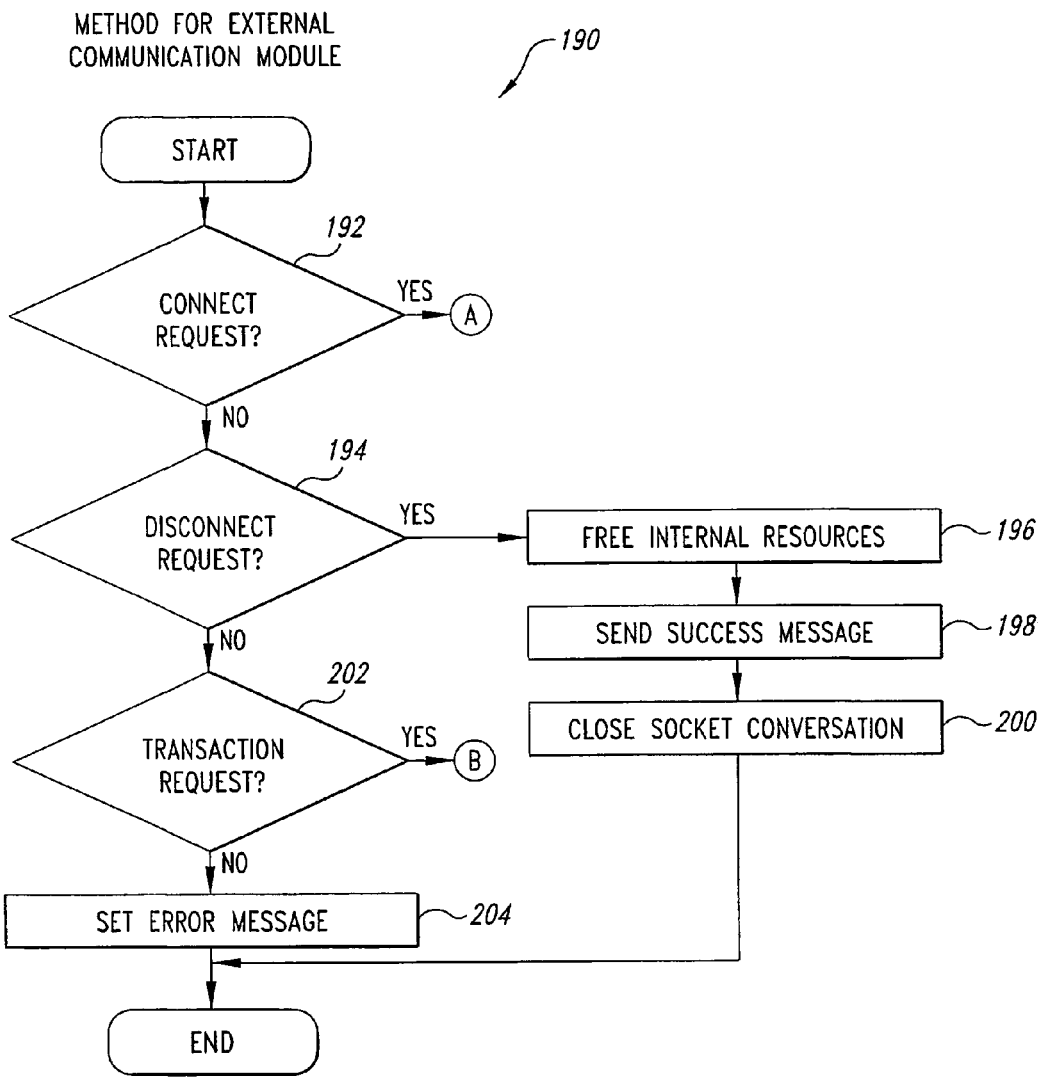
FIGS. 5A, 5B, and 5C combine to describe a flowchart illustrating a method implemented by the external communication module associated with the transaction access control system, as illustrated in FIG. 2.
Figure 5B:
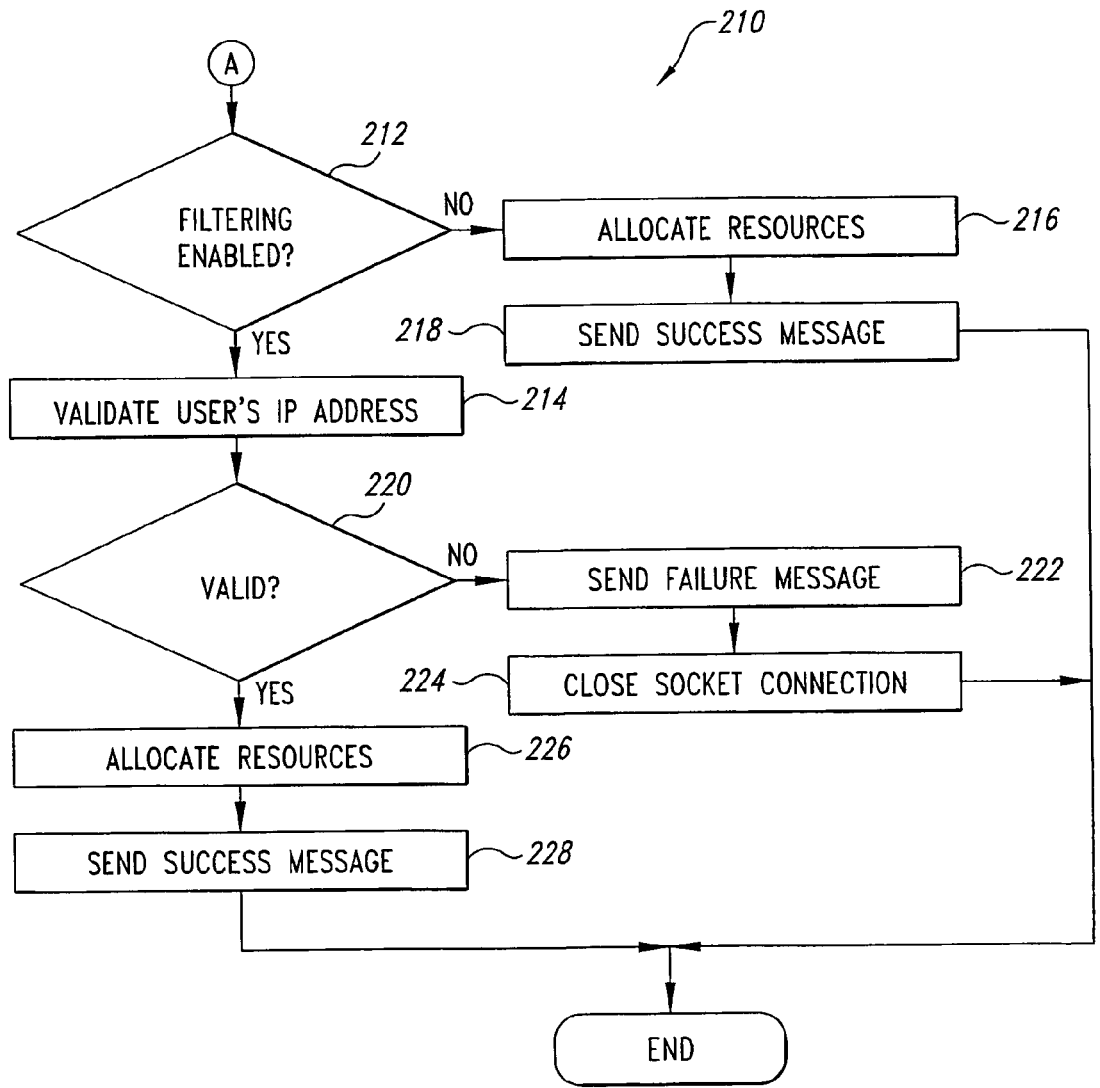
Figure 5C:
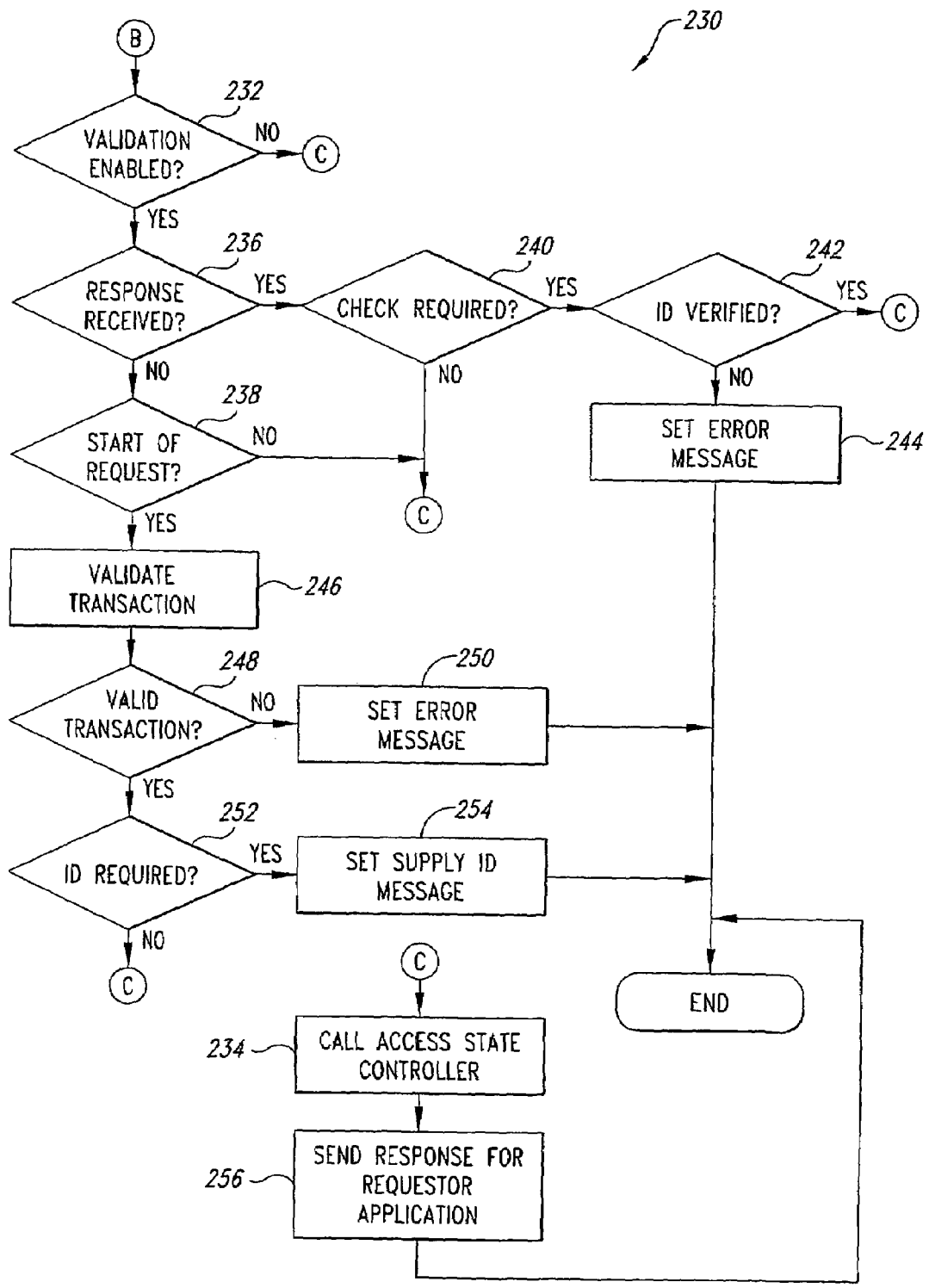

An illustration of a method 190 of a representative implementation for the external communication module 110 is shown in FIGS. 5A, 5B, and 5C. According to the method 190, the external communication module 110 receives a communication from one of the requester applications 121, a determination is made whether the communication is a connect request and if not (NO branch of decision step 192), a determination is made whether the communication is a disconnect request and if not (NO branch of decision step 194), a determination is made whether the communication is a transaction request and if not (NO branch of decision step 202), an error message is set (step 204) and the method 190 returns to the caller or ends.

If the communication is a connect request (YES branch of decision step 192), a method 210, illustrated in FIG. 5B, is executed starting by determining whether filtering is enabled and if so (YES branch of decision step 212), the network protocol address (such as an IP or IPX address) associated with the origination of the communication is validated (step 214) and the method goes to decision step 220. If the network protocol address (such as an IP or IPX address) is valid (YES branch of decision step 220), resources are allocated (step 226), a success message is sent (step 228) and the method 210 returns to the caller or ends. If filtering is not enabled (NO branch of decision step 212), resources are allocated (step 216), a success message is sent (step 218), and the method 210 returns to the caller or ends. If the network protocol address (such as an IP or IPX address) is not valid (NO branch of decision step 220), a failure message is sent (step 222), the socket connection associated with the communication is closed (step 224), and the method 210 returns to the caller or ends. If the communication is a disconnect request (YES branch of decision step 194 of FIG. 5A), internal resources are freed (step 196), a success message is sent (step 198), and the method 190 returns to the caller or ends.

If the communication is a transaction request (YES branch of decision step 202), a method 230 is executed, illustrated in FIG. 5C, starting by determining whether validation has been enabled and if not (NO branch of decision step 232), the access state controller 112 is called (step 234), a response for the external application associated with the communication is formatted and sent (step 256), and the method 230 returns to the caller or ends. Otherwise (YES branch of decision step 232), a determination is made whether a response has been received and if so (YES branch of decision step 236), a determination is made whether an identification check is required and if so (YES branch of decision step 240), identification is verified in decision step 242. If an identification check is not required (NO branch of decision step 240), the method 230 goes to step 234. If identification is not verified (NO branch of decision step 242), an error message is set (step 244), and the method 230 returns to the caller or ends. Otherwise (YES branch of decision step 242), the method 230 goes to step 234. If a response has not been received (NO branch of decision step 236), a determination is made whether the communication is a start of a request and if not (NO branch of decision step 238), the method 230 goes to step 234. Otherwise (YES branch of decision step 238), the transaction is validated (step 246). If the transaction is not valid (NO branch of decision step 248), an error message is set (step 250) and the method 230 returns to the caller or ends. If the transaction is valid (YES branch of decision step 248), determination is made whether identification is required and if so (YES branch of decision step 252), a message is set to supply identification (step 254) and the method 230 returns to the caller or ends. Otherwise (NO branch of decision step 252), the method 230 goes to step 234.

Figure 6:
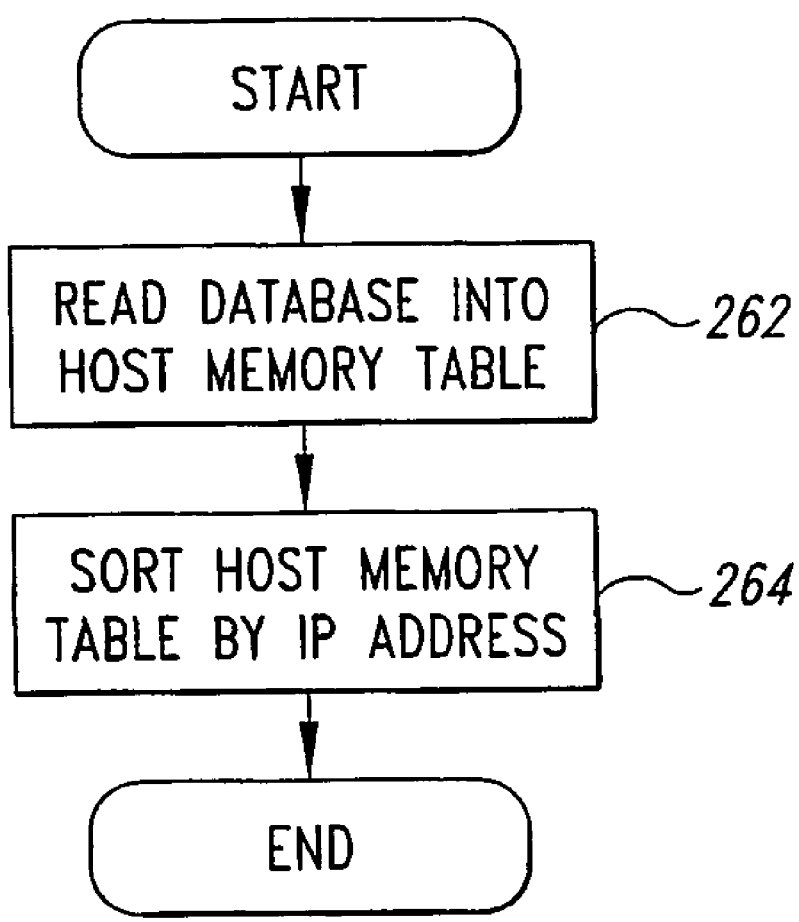
FIG. 6 is a flowchart illustrating a method implemented by the validator associated with the transaction access control system, as illustrated in FIG. 2, for validator preparation.

An illustration of a method 260 associated with the transaction access control system 100 regarding preparation by the validator 118 is provided by FIG. 6. The method 260 has the requester database 114 read into a host memory table of the legacy host data system 80 (step 262). The host memory table is then sorted by network protocol address (such as an IP or IPX address) (step 264). The method 260 then returns to the caller or ends.

Figure 7:
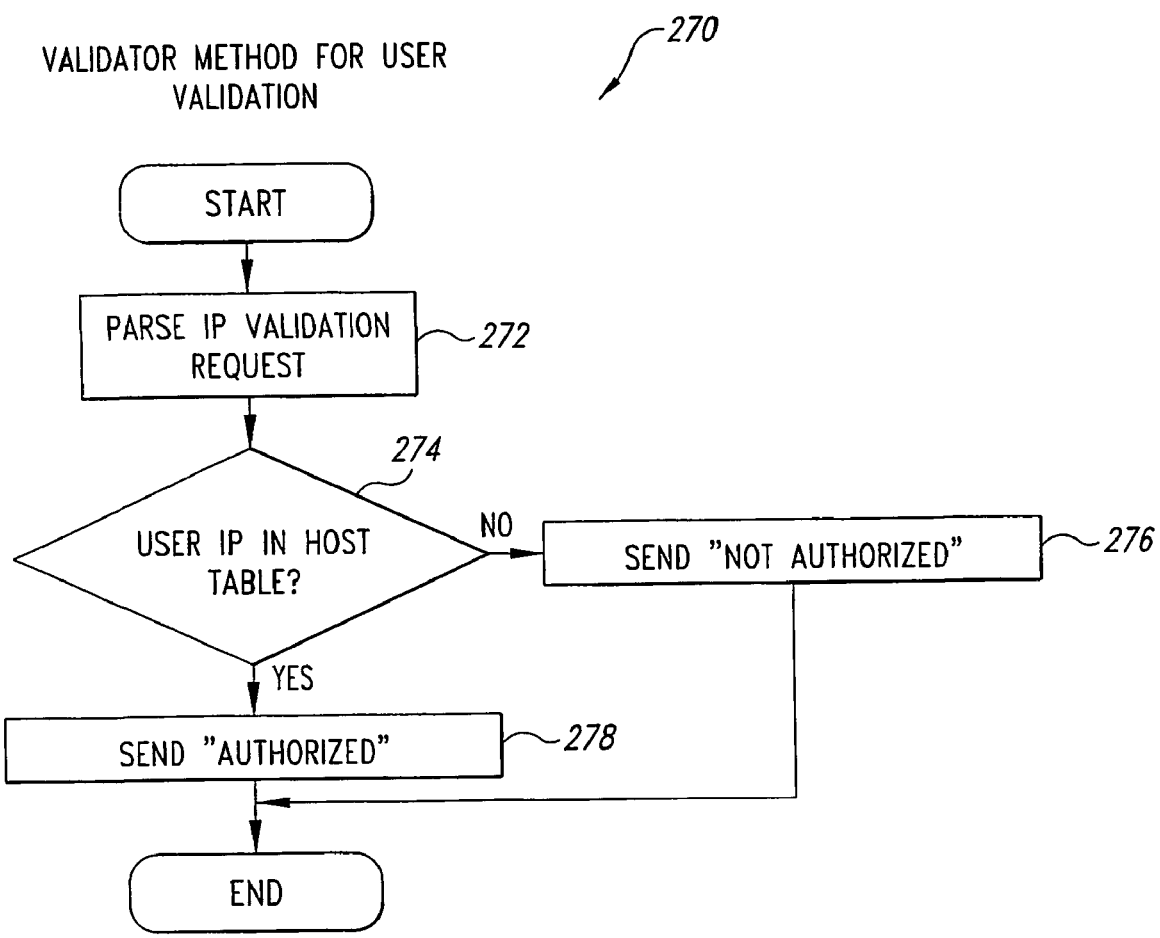
FIG. 7 is a flowchart illustrating a method implemented by the validation associated with the transaction access control system, as illustrated in FIG. 2, for end-user validation.

An illustration of a method 270 associated with the transaction access control system 100 regarding user validation performed by the validator 118 on a network protocol address (such as an IP or PX address) contained in one of the connect requests 130 sent by one of the end-user computers 120 is provided by FIG. 7. The method 270 performed by the validator 118 parses the network protocol address 134 (such as an IP or IPX address) sent to the validator in a validation request by the external communication module 110 (step 272). If the network protocol address 134 is not in the host memory table containing the requester database 114 (NO branch of decision step 274), the validator 118 indicates in the connect response 136 sent back to external communication module 110 that the network protocol address (such as an IP or IPX address) is not authorized (step 276) and the method 270 returns to the caller or ends. Otherwise (YES branch of decision step 274), the validator 118 indicates in the connect response 136 sent back to external communication module 110 that the network protocol address 134 (such as an IP or IPX address) is authorized (step 278) and the method 270 returns to the caller or ends.

Figure 8:
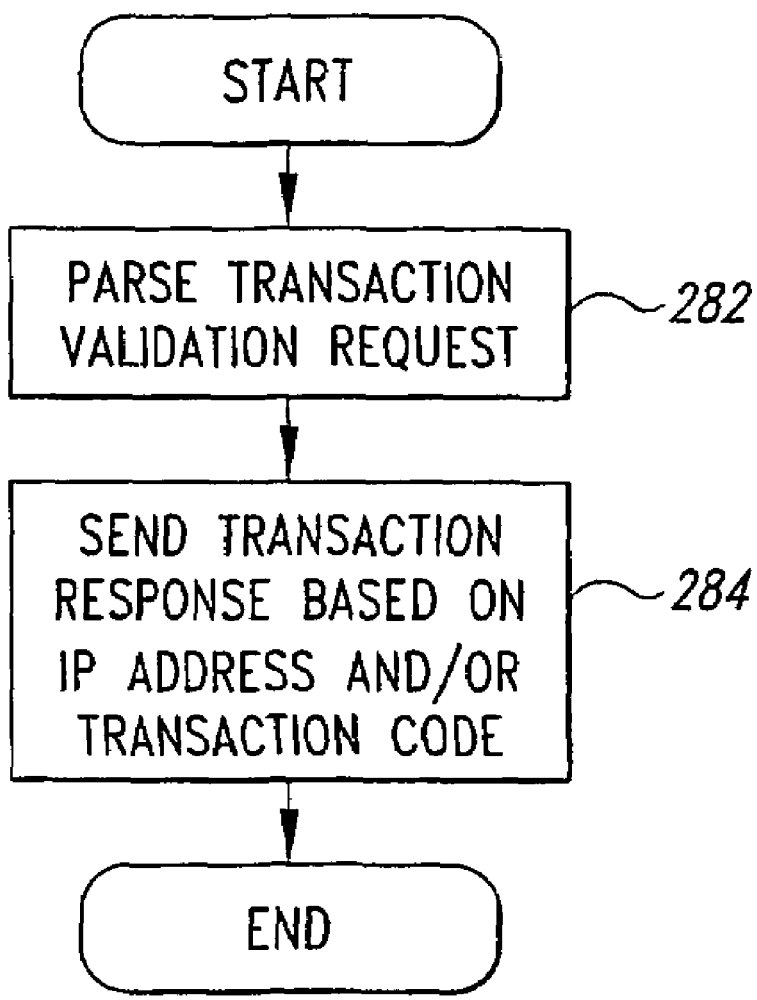
FIG. 8 is a flowchart illustrating a general method implemented by the validator associated with the transaction access control system, as illustrated in FIG. 2, for transaction validation.

An illustration of a method 280 associated with the transaction access control system 100 regarding transaction validation performed by the validator 118 on transaction request data contained in one of the transaction requests 140 sent by one of the end-user computers 120 is provided by FIG. 8. The method 280 performed by the validator 118 parses the network protocol address 134 (such as an IP or IPX address) of the end-user computer 120 contained by one of the messages 144 and transaction request code sent to the validator within one of the messages 144 containing the network protocol address 134 (such as an IP or IPX address) of the end-user computer 120 by the access state controller 112 (step 282). The validator 118 then determines, based upon the network protocol address 134 and the code of the transaction request found in the message 144, the appropriate response to send back to the access state controller 112. Based upon this determination, the validator 118 then sends one of the transaction responses 146 back to the access state controller 112 indicating whether the transaction request has been authorized, has been denied, or whether the end-user computer 120 must be challenged for a username and password (step 284) and the method 280 returns to the caller or ends.

An illustration of a method 290 containing a more detailed representative example associated with the transaction access control system 100 regarding transaction validation performed by the validator 118 on a transaction request contained in one of the connect requests 140 sent by one of the end-user computers 120 is provided by FIG. 9. The method 290 performed by the validator 118 parses the network protocol address 134 (such as an IP or IPX address) of the end-user computer 120 contained by one of the messages 144 and transaction request code sent to the validator within one of the messages 144 containing the network protocol address 134 (such as an IP or IPX address) of the end-user computer 120 by the access state controller 112 (step 292). The validator 118 then determines, based upon the network protocol address 134 and the code of the transaction request found in the message 144, the appropriate response to send back to the access state controller 112. Based upon this determination, the validator 118 then sends one of the transaction responses 146 back to the access state controller 112 indicating whether the transaction request has been authorized, has been denied, or whether the end-user computer 120 must be challenged for a username and password. For instance, if the validator 118 determines that the requested transaction is unknown to the internal transaction 102 (NO branch of decision step 294), the validator returns the transaction response 146 to the access state controller 112 indicating that the transaction is invalid (step 296) and the method 290 returns to the caller or ends. Otherwise (YES branch of decision step 294), if the validator 118 determines that the network protocol address 134 is not authorized (NO branch of decision step 298), the validator returns the transaction response 146 to the access state controller 112 indicating that the network protocol address is not authorized (step 300) and the method 290 returns to the caller or ends. Otherwise (YES branch of decision step 298), if the validator 118 determines that the end-user computer 120 should not be challenged for a usename and password (NO branch of decision step 302), the validator returns the transaction response 146 to the access state controller 112 indicating that the transaction request is authorized and no challenges for username and password are necessary (step 304) and the method 290 returns to the caller or ends. Otherwise (YES branch of decision step 302), if the validator 118 determines that the username and password submitted by the end-user computer 120 in response to the challenge does not need to be compared with the requester database 114 before sending them to the external security manager 116 (NO branch of decision step 306), the validator returns the transaction response 146 to the access state controller 112 indicating that the transaction request is authorized, the end-user computer should be challenged for username and password, and that the username and password submitted by the end-user computer does not need to be compared (step 308) and the method 290 returns to the caller or ends. Otherwise (YES branch of decision step 306), the validator returns the transaction response 146 to the access state controller 112 indicating that the transaction request is authorized, the end-user computer 120 should be challenged for username and password, and that the username and password submitted by the end-user computer is to be compared with the requester database 114 before sending them to the external security manager 116 (step 310) and the method 290 returns to the caller or ends.

From the foregoing it will be appreciated that, although specific implementations of the invention have been described herein for purposes of illustration, various modifications may be made without deviating from the spirit and scope of the invention. Accordingly, the invention is not limited except as by the appended claims.

The invention claimed is:

1. For use with an internal transaction area and an internal application running in the internal transaction area on a host computer connected to a network, for use with an external security manager configured to receive and authenticate a first plurality of pairs of usernames and passwords to permit or deny access to the internal transaction area, and for use with a first plurality of end-user computers communicatively linked to the host computer via the network, the end-user computers each having at least one of a first plurality of network protocol addresses and a requester application, a transaction access control system comprising:

a requester database configured to contain for each of the first plurality of network protocol addresses of the first plurality of end-user computers, an associated one of the first plurality of pairs of usernames and passwords;

a controller configured to receive the first plurality of network protocol addresses sent from the first plurality of the end-user computers via the network and received by the host computer; and a validator configured to retrieve from the requester database each of the first plurality of username and password pairs associated with each of the first plurality of network protocol addresses based upon at least each of the first plurality of network protocol addresses, the controller being configured to transmit each of the retrieved username and password pairs to be authenticated by the external security manager to permit access to the internal transaction area to each of the requester applications of the end-user computers having the first plurality of network protocol addresses which are associated with the retrieved username and password pairs.

2. The system of claim 1 wherein the controller is configured to run on the host computer.

3. The system of claim 1, further including a configurator configured to configure information in the requester database.

4. The system of claim 3 wherein the configurator is configured to run on the host computer.

5. The system of claim 3 wherein the configurator is communicatively linked to the host computer via the network.

6. The system of claim 1, further including a listener configured to receive connect requests sent by end-user computers including the first plurality of end-user computers and other end-user computers, the connect requests containing the at least one of the network protocol address of the sending end-user computer, and configured to forward the at least one of the network protocol address of the sending end-user computers to be received by the validator, and wherein the validator is further configured to determine whether the network protocol addresses of the sending end-user computers are contained in the requester database.

7. The system of claim 1 wherein the requester application of the end-user computer is configured to send transaction codes to the host computer to initiate transactions associated with the internal application, wherein the requester database is further configured to contain information associated with the transaction codes for each network protocol address, wherein the controller is further configured to receive the transaction codes sent by the end-user computer and received by the host computer to forward to the validator, and wherein the validator is further configured to retrieve each of the username and password pairs associated with each of the first plurality of network protocol addresses based further upon the information associated with the transaction codes contained in the requester database.

8. The system of claim 7 wherein each of the transactions have execution priorities further associated with the transaction codes that initiate each transaction.

9. The system of claim 7 wherein the transactions have execution priorities associated with the at least one network protocol address of the end-user computer of the requester application that sent the transaction codes to the host computer.

10. The system of claim 9 wherein each of the transactions have execution priorities further associated with the transaction codes that initiate each transaction.

11. The system of claim 7 wherein the information associated with the transaction codes indicates that some of the transactions associated with the transaction codes are not to be permitted access to the internal transaction access area for a select number of the first plurality of network protocol addresses associated with a select number of the first plurality of end-user computers.

12. The system of claim 11 wherein the select number of the first plurality of network protocol addresses includes all of the first plurality of network protocol addresses.

13. The system of claim 1 wherein the requester database is further configured to contain for each of a second plurality of network protocol addresses of a second plurality of end-user computers, an associated one of a second plurality of pairs of usernames and passwords and further configured to contain challenge information indicating at least that the second plurality of end-user computers must be challenged to send one of the second plurality of pairs of usernames and passwords to the host computer, and wherein the external security manager is further configured to receive and authenticate the second plurality of pairs of usernames and passwords.

14. The system of claim 13 wherein the validator is further configured to determine that one of the second plurality of an end-user computers having one of the second plurality of network protocol addresses received by the host computer is to be challenged to send a username and password.

15. The system of claim 14 wherein the validator is further configured to determine whether a username and password pair sent from one of the second plurality of end-user computers having one of the second plurality of network protocol addresses should be compared with the usename and password pair in the requester database associated with the same one of the second plurality of network protocol addresses.

16. The system of claim 1, further including an external communication module configured to receive a first communication and a second communication from the requester applications, the first communication being formatted in a first format and based on a non-compliant language, the non-compliant language being non-compliant with the internal transaction area, the second communication being formatted in a second format compliant with the internal transaction area and based on a compliant language, the compliant language being compliant with the internal transaction area, the external communication module configured to convert the format of the first communication from the first format into the second format, the external communication module configured to receive an internal communication originating from the internal applications having the second format, the external communication module configured to convert, if needed, the format of the received internal communication from the second format into the first format, and configured to send the internal communication to the requester applications, at least in part, upon addressing of the internal communication.

17. The system of claim 16 wherein the external communication module is configured to run on the host computer.

18. The system of claim 16 wherein the internal transaction area is based on IBM CICS and the external communication module is configured to convert communication having non-compliant language into communication having language compliant with IBM CICS.

19. The system of claim 16 wherein the non-compliant language is one of the following: HLLAPI and SEACL.

20. For use with an internal transaction area and an internal application running in the internal transaction area on a host computer connected to a network, for use with an external security manager configured to receive and authenticate a first plurality of pairs of usernames and passwords to permit or deny access to the internal transaction area, and for use with a first plurality of end-user computers communicatively linked to the host computer via the network, the end-user computers each having at least one of a first plurality of network protocol addresses and a requester application, a method comprising:
  containing for each of the first plurality of network protocol addresses of the first plurality of end-user computers, an associated one of the first plurality of pairs of usernames and passwords;
  receiving the first plurality of network protocol addresses sent from the first plurality of the end-user computers via the network and received by the host computer;
  retrieving from the requester database each of the first plurality of username and password pairs associated with each of the first plurality of network protocol addresses based upon at least each of the first plurality of network protocol addresses; and
  transmitting each of the retrieved username and password pairs to be authenticated by the external security manager to permit access to the internal transaction area to each of the requester applications of the end-user computers having the first plurality of network protocol addresses which are associated with the retrieved username and password pairs.

21. The method of claim 20, further including configuring information in the requester database.

22. The method of claim 21 wherein the configuring is performed via a communication link to the host computer via the network.

23. The method of claim 20, further including receiving connect requests sent by end-user computers including the first plurality of end-user computers and other end-user computers, the connect requests containing the at least one network protocol address of the sending end-user computer, and forwarding the at least one network protocol address of the sending end-user computers to be received by the validator; and further including determining whether the network protocol addresses of the sending end-user computers are contained in the requester database.

24. The method of claim 20 wherein the requester application of the end-user computer is configured to send transaction codes to the host computer to initiate transactions associated with the internal application, and further including containing information associated with the transaction codes for each network protocol address, receiving the transaction codes sent by the end-user computer and received by the host computer to forward to the validator, and retrieving each of the usename and password pairs associated with each of the first plurality of network protocol addresses based further upon the information associated with the transaction codes contained in the requester database.

25. The method of claim 24 wherein the transactions have execution priorities associated with their transaction codes.

26. The method of claim 24 wherein the transactions have execution priorities associated with the at least one network protocol address of the end-user computer of the requester application that sent the transaction codes to the host computer.

27. The method of claim 26 wherein each of the transactions have execution priorities further associated with the transaction codes that initiate each transaction.

28. The method of claim 24 wherein the information associated with the transaction codes indicates that some of the transactions associated with the transaction codes are not to be permitted access to the internal transaction access area for a select number of the first plurality of network protocol addresses associated with a select number of the first plurality of end-user computers.

29. The method of claim 28 wherein the select number of the first plurality of network protocol addresses includes all of the first plurality of network protocol addresses.

30. The method of claim 20, further including containing for each of a second plurality of network protocol addresses of a second plurality of end-user computers, an associated one of a second plurality of pairs of usernames and passwords, containing challenge information indicating at least that the second plurality of end-user computers must be challenged to send one of the second plurality of pairs of usernames and passwords to the host computer, and wherein the external security manager is further configure to receive and authenticate the second plurality of pairs of usernames and passwords.

31. The method of claim 30, further comprising determining that one of the second plurality of an end-user computers having one of the second plurality of network protocol addresses received by the host computer is to be challenged to send a username and password.

32. The method of claim 31, further comprising determining whether a username and password pair sent from one of the second plurality of end-user computers having one of the second plurality of network protocol addresses should be compared with the username and password pair in the requester database associated with the same one of the second plurality of network protocol addresses.

33. The method of claim 20, further including receiving a first communication and a second communication from the requester applications, the first communication being formatted in a first format and based on a non-compliant language, the non-compliant language being non-compliant with the internal transaction area, the second communication being formatted in a second format compliant with the internal transaction area and based on a compliant language, the compliant language being compliant with the internal transaction area, converting the format of the first communication from the first format into the second format, receiving an internal communication originating from the internal applications having the second format, converting, if needed, the format of the received internal communication from the second format into the first format, and sending the internal communication to the requester applications, at least in part, upon addressing of the internal communication.

34. The method of claim 33 wherein the internal transaction area is based on IBM CICS and further comprising converting communication having non-compliant language into communication having language compliant with IBM CICS.

35. The method of claim 33 wherein the non-compliant language is one of the following: HLLAPI and SEACL.

36. For use with an internal transaction area and an internal application running in the internal transaction area on a host computer connected to a network, for use with an external security manager configured to receive and authenticate a first plurality of pairs of usernames and passwords to permit or deny access to the internal transaction area, and for use with a first plurality of end-user computers communicatively linked to the host computer via the network, the end-user computers each having at least one of a first plurality of network protocol addresses and a requester application, a computer-readable medium whose contents cause a computer to perform by:

containing for each of the first plurality of network protocol addresses of the first plurality of end-user computers, an associated one of the first plurality of pairs of usernames and passwords;

receiving the first plurality of network protocol addresses sent from the first plurality of the end-user computers via the network and received by the host computer;

retrieving from the requester database each of the first plurality of username and password pairs associated with each of the first plurality of network protocol addresses based upon at least each of the first plurality of network protocol addresses; and transmitting each of the retrieved username and password pairs to be authenticated by the external security manager to permit access to the internal transaction area to each of the requester applications of the end-user computers having the first plurality of network protocol addresses which are associated with the retrieved username and password pairs.

37. The computer-readable medium of claim 36, whose contents further cause a computer to perform by: configuring information in the requester database.

38. The computer-readable medium of claim 37 wherein the configuring is performed via a communication link to the host computer via the network.

39. The computer-readable medium of claim 36, whose contents further cause a computer to perform by: receiving connect requests sent by end-user computers including the first plurality of end-user computers and other end-user computers, the connect requests containing the at least one network protocol address of the sending end-user computer, and forwarding the at least one network protocol address of the sending end-user computers to be received by the validator; and whose contents further cause a computer to perform by determining whether the network protocol addresses of the sending end-user computers are contained in the requester database.

40. The computer-readable medium of claim 36 wherein the requester application of the end-user computer is configured to send transaction codes to the host computer to initiate transactions associated with the internal application, and whose contents further cause a computer to perform by containing information associated with the transaction codes for each network protocol address, receiving the transaction codes sent by the end-user computer and received by the host computer to forward to the validator, and retrieving each of the username and password pairs associated with each of the first plurality of network protocol addresses based further upon the information associated with the transaction codes contained in the requester database.

41. The computer-readable medium of claim 40 wherein the transactions have execution priorities associated with their transaction codes.

42. The computer-readable medium of claim 40 wherein the transactions have execution priorities associated with the at least one network protocol address of the end-user computer of the requester application that sent the transaction codes to the host computer.

43. The computer-readable medium of claim 42 wherein each of the transactions have execution priorities further associated with the transaction codes that initiate each transaction.

44. The computer-readable medium of claim 40 wherein the information associated with the transaction codes indicates that some of the transactions associated with the transaction codes are not to be permitted access to the internal transaction access area for a select number of the first plurality of network protocol addresses associated with a select number of the first plurality of end-user computers.

45. The computer-readable medium of claim 44 wherein the select number of the first plurality of network protocol addresses includes all of the first plurality of network protocol addresses.

46. The computer-readable medium of claim 36, whose contents further cause a computer to perform by containing for each of a second plurality of network protocol addresses of a second plurality of end-user computers, an associated one of a second plurality of pairs of usernames and passwords, containing challenge information indicating at least that the second plurality of end-user computers must be challenged to send one of the second plurality of pairs of usernames and passwords to the host computer, and wherein the external security manager is further configure to receive and authenticate the second plurality of pairs of usernames and passwords.

47. The computer-readable medium of claim 36, whose contents further cause a computer to perform by determining that one of the second plurality of an end-user computers having one of the second plurality of network protocol addresses received by the host computer is to be challenged to send a username and password.

48. The computer-readable medium of claim 47, whose contents further cause a computer to perform by determining whether a username and password pair sent from one of the second plurality of end-user computers having one of the second plurality of network protocol addresses should be compared with the username and password pair in the requester database associated with the same one of the second plurality of network protocol addresses.

49. The computer-readable medium of claim 36, whose contents further cause a computer to perform by receiving a first communication and a second communication from the requester applications, the first communication being formatted in a first format and based on a non-compliant language, the non-compliant language being non-compliant with the internal transaction area, the second communication being formatted in a second format compliant with the internal transaction area and based on a compliant language, the compliant language being compliant with the internal transaction area, converting the format of the first communication from the first format into the second format, receiving an internal communication originating from the internal applications having the second format, converting, if needed, the format of the received internal communication from the second format into the first format, and sending the internal communication to the requester applications, at least in part, upon addressing of the internal communication.

50. The computer-readable medium of claim 49 wherein the internal transaction area is based on IBM CICS and further comprising converting communication having non-compliant language into communication having language compliant with IBM CICS.

51. The computer-readable medium of claim 49 wherein the non-compliant language is one of the following: HLLAPI and SEACL.

52. For use with an internal transaction area and an internal application running in the internal transaction area on a host computer connected to a network, for use with an external security manager configured to receive and authenticate a first plurality of pairs of usernames and passwords to permit or deny access to the internal transaction area, and for use with a first plurality of end-user computers communicatively linked to the host computer via the network, the end-user computers each having at least one of a first plurality of network protocol addresses and a requester application, a transaction control system comprising:
   means for containing for each of the first plurality of network protocol addresses of the first plurality of end-user computers, an associated one of the first plurality of pairs of usernames and passwords;
   means for receiving the first plurality of network protocol addresses sent from the first plurality of the end-user computers via the network and received by the host computer;
   means for retrieving from the requester database each of the first plurality of username and password pairs associated with each of the first plurality of network protocol addresses based upon at least each of the first plurality of network protocol addresses; and
   means for transmitting each of the retrieved username and password pairs to be authenticated by the external security manager to permit access to the internal transaction area to each of the requester applications of the end-user computers having the first plurality of network protocol addresses which are associated with the retrieved username and password pairs.

53. The system of claim 52, further including means for configuring information in the requester database.

54. The system of claim 53 wherein the means for configuring is performed via a communication link to the host computer via the network.

55. The system of claim 52, further including means for receiving connect requests sent by end-user computers including the first plurality of end-user computers and other end-user computers, the connect requests containing the at least one network protocol address of the sending end-user computer, and means for forwarding the at least one network protocol address of the sending end-user computers to be received by the validator; and further including means for determining whether the network protocol addresses of the sending end-user computers are contained in the requester database.

56. The system of claim 52 wherein the requester application of the end-user computer is configured to send transaction codes to the host computer to initiate transactions associated with the internal application, and further including means for containing information associated with the transaction codes for each network protocol address, means for receiving the transaction codes sent by the end-user computer and received by the host computer to forward to the validator, and means for retrieving each of the usename and password pairs associated with each of the first plurality of network protocol addresses based further upon the information associated with the transaction codes contained in the requester database.

57. The system of claim 56 wherein the transactions have execution priorities associated with their transaction codes.

58. The system of claim 56 wherein the transactions have execution priorities associated with the at least one network protocol address of the end-user computer of the requester application that sent the transaction codes to the host computer.

59. The system of claim 58 wherein each of the transactions have execution priorities further associated with the transaction codes that initiate each transaction.

60. The system of claim 56 wherein the information associated with the transaction codes indicates that some of the transactions associated with the transaction codes are not to be permitted access to the internal transaction access area for a select number of the first plurality of network protocol addresses associated with a select number of the first plurality of end-user computers.

61. The system of claim 60 wherein the select number of the first plurality of network protocol addresses includes all of the first plurality of network protocol addresses.

62. The system method of claim 52, further including means for containing for each of a second plurality of network protocol addresses of a second plurality of end-user computers, an associated one of a second plurality of pairs of usernames and passwords, means for containing challenge information indicating at least that the second plurality of end-user computers must be challenged to send one of the second plurality of pairs of usernames and passwords to the host computer, and wherein the external security manager is further configure to receive and authenticate the second plurality of pairs of usernames and passwords.

63. The system of claim 62, further comprising means for determining that one of the second plurality of an end-user computers having one of the second plurality of network protocol addresses received by the host computer is to be challenged to send a username and password.

64. The system of claim 63, further comprising means for determining whether a username and password pair sent from one of the second plurality of end-user computers having one of the second plurality of network protocol addresses should be compared with the username and password pair in the requester database associated with the same one of the second plurality of network protocol addresses.

65. The system of claim 52, further including means for receiving a first communication and a second communication from the requester applications, the first communication being formatted in a first format and based on a non-compliant language, the non-compliant language being non-compliant with the internal transaction area, the second communication being formatted in a second format compliant with the internal transaction area and based on a compliant language, the compliant language being compliant with the internal transaction area, means for converting the format of the first communication from the first format into the second format, means for receiving an internal communication originating from the internal applications having the second format, means for converting, if needed, the format of the received internal communication from the second format into the first format, and means for sending the internal communication to the requester applications, at least in part, upon addressing of the internal communication.

66. The system of claim 65 wherein the internal transaction area is based on IBM CICS and further comprising means for converting communication having non-compliant language into communication having language compliant with IBM CICS.

67. The system of claim 65 wherein the non-compliant language is one of the following: HLLAPI and SEACL.

* * * * *